(12) United States Patent
Roach

(10) Patent No.: US 10,563,783 B2
(45) Date of Patent: Feb. 18, 2020

(54) PRESSURE REGULATING DEVICE

(71) Applicant: Innoflate, LLC, Richardson, TX (US)

(72) Inventor: Grahm Collins Roach, San Antonio, TX (US)

(73) Assignee: Innoflate, LLC, Richardson, UM (US)

( * ) Notice: Subject to any disclaimer, the term of this patent is extended or adjusted under 35 U.S.C. 154(b) by 0 days.

(21) Appl. No.: 16/455,504

(22) Filed: Jun. 27, 2019

(65) Prior Publication Data

US 2020/0018409 A1    Jan. 16, 2020

Related U.S. Application Data

(60) Provisional application No. 62/696,855, filed on Jul. 12, 2018.

(51) Int. Cl.
  *F16K 17/02*  (2006.01)
  *F04B 33/00*  (2006.01)
  *A63B 41/12*  (2006.01)

(52) U.S. Cl.
  CPC .............. *F16K 17/02* (2013.01); *A63B 41/12* (2013.01); *F04B 33/005* (2013.01); *Y10T 137/3709* (2015.04)

(58) Field of Classification Search
  CPC ........ F16K 17/02; A63B 41/12; F04B 33/005; Y10T 137/36; Y10T 137/3709; Y10T 137/3646; Y10T 137/7741
  USPC ......................................... 137/224, 226, 230
  See application file for complete search history.

(56) References Cited

U.S. PATENT DOCUMENTS

| 919,658 | A | * | 4/1909 | Washburn | ............... B60S 5/043 137/224 |
| 1,196,142 | A | * | 8/1916 | Schroeder | ............... B60S 5/043 137/224 |
| 1,649,530 | A | * | 11/1927 | Holsinger | ................. B60S 5/04 137/227 |

(Continued)

FOREIGN PATENT DOCUMENTS

WO     WO199302310      2/1993

OTHER PUBLICATIONS

KIPO, International Search Report and Written Opinion dated Oct. 22, 2019, in PCT/US2019/039861, 11 pgs.

*Primary Examiner* — Craig J Price
(74) *Attorney, Agent, or Firm* — Henry Patent Law Firm PLLC

(57) ABSTRACT

In a general aspect, a pressure regulating device helps achieve a correct inflation pressure of an inflatable object. In some aspects, an inflation device includes an inlet, and outlet, and a vent port. The inflation device also includes one or more interior surfaces that define a gas-delivery pathway fluidly-coupling the inlet and the outlet. A flow restriction is disposed along the gas-delivery pathway between the inlet and the outlet. Moreover, an opening is disposed along the gas-delivery pathway adjacent the flow restriction and downstream thereof. The inflation device also includes a gas-exhaust pathway fluidly-coupling the opening and the vent port. A first chamber of the gas-exhaust pathway is in fluid communication with the opening, and a second chamber of the gas-exhaust pathway is in fluid communication with the vent port. A pressure-relief valve is configured to control gas flow between the first chamber and the second chamber.

17 Claims, 2 Drawing Sheets

(56) References Cited

U.S. PATENT DOCUMENTS

| | | | | |
|---|---|---|---|---|
| 2,011,562 | A | * | 8/1935 | Crowley ............... F16K 15/202 |
| | | | | 473/603 |
| 3,074,457 | A | * | 1/1963 | Tubbs .................... B60S 5/043 |
| | | | | 152/427 |
| 3,217,733 | A | * | 11/1965 | Howard ............... B60C 29/007 |
| | | | | 137/226 |
| 3,429,332 | A | | 2/1969 | Mazeika |
| 3,996,957 | A | | 12/1976 | Goldish et al. |
| 4,098,048 | A | | 7/1978 | Sawa et al. |
| 4,658,979 | A | * | 4/1987 | Mietz .................... B65D 83/42 |
| | | | | 141/20 |
| 4,714,098 | A | | 12/1987 | Stuckel |
| 5,556,258 | A | | 9/1996 | Lange et al. |
| 5,694,969 | A | | 12/1997 | Devuyst |
| 5,778,923 | A | | 7/1998 | Marston |
| 7,040,355 | B2 | | 5/2006 | Wu |
| 7,073,527 | B1 | | 7/2006 | Freire Teiga |
| 7,331,221 | B2 | | 2/2008 | Wise et al. |
| 7,430,900 | B2 | | 10/2008 | Belanger |
| 8,402,988 | B2 | | 3/2013 | Campau |
| 8,833,395 | B2 | * | 9/2014 | Weng .................... F04B 33/005 |
| | | | | 137/226 |
| 8,893,741 | B2 | * | 11/2014 | Weng ...................... F04B 53/10 |
| | | | | 137/224 |
| 9,108,474 | B2 | * | 8/2015 | Chu ...................... B60C 29/068 |
| 9,937,760 | B2 | * | 4/2018 | Austin .................. B60C 29/002 |
| 2003/0178092 | A1 | * | 9/2003 | Birmingham .......... A63B 41/12 |
| | | | | 141/38 |
| 2004/0103939 | A1 | | 6/2004 | Beau |
| 2008/0078450 | A1 | | 4/2008 | Milanovich et al. |
| 2009/0308462 | A1 | | 12/2009 | Badstue et al. |
| 2014/0216570 | A1 | * | 8/2014 | Connors ............... F16K 15/207 |
| | | | | 137/230 |
| 2017/0144494 | A1 | | 5/2017 | Jochumsen |

\* cited by examiner

200 B2

PRESSURE REGULATING DEVICE

CROSS-REFERENCE TO RELATED APPLICATIONS

This application claim priority to U.S. Provisional Application No. 62/696,855 filed Jul. 12, 2018 and entitled "Pressure Regulating Device. The priority application is hereby incorporated by reference.

BACKGROUND

The following description relates to pressure regulation, including regulating the pressure of inflatable objects using inflating devices (e.g., using a hand pump to inflate sports balls, tires, inner tubes, etc.).

Some conventional pressure regulation mechanisms use an inline pressure gauge with a manually operated vent port without a pressure relief valve to regulate the pressure of the inflated object during inflation. Pressure regulators and pressure relief valves are ubiquitous throughout many industries; however, most are not conducive for portable use due to size and cost limitations.

DETAILED DESCRIPTION

In some conventional pressure regulation devices, a flow restriction exists between the pumping device and the inlet to the inflatable object which requires pressures significantly higher than the target pressure to push the inflating fluid into the inflatable object at a satisfactory rate. This presents a significant problem for using a traditional pressure regulator or relief valve with such conventional pressure regulation devices. Simply adding a pressure relief valve or pressure regulator inline will either result in the valve opening prematurely as a result of the increased pressure required to force the inflating fluid through the inlet orifice or will require minimal airflow into the inflatable object, thus significantly prolonging the time required for inflation.

In some implementations, the pressure regulation devices and techniques described here may address these and other challenges, for example, by incorporating an inlet orifice geometry in a flow path of a pressure regulating valve. In some cases, the pressure regulation devices and techniques described here allow a user to inflate an object and, once the desired internal pressure has been reached or exceeded, the pressure regulation device will vent the internal pressure of the inflation object to the target level and, in some instances, may also alert the user. In some of the examples described here, a pressure regulating device can be incorporated into an inflation needle for the inflation of sports balls (e.g., soccer balls, volleyballs, basketballs, footballs, etc.). Alternative embodiments exist for use with non-needle inflatable objects, such as, for example, bicycle tires, automobile tires, floating objects (e.g., river rafts, pool toys, etc.), and potentially other types of inflatable objects.

In some implementations, the pressure regulation devices and techniques described here may provide technical improvements and advantages over conventional products. For example, a pressure regulation device may, in some instances, ensure correct inflation of the inflatable object without a pressure gauge; allow a user to accurately inflate an inflatable object without knowledge of correct inflation pressure; actively regulate the pressure (e.g., by releasing air) while a user is operating a pump, thus eliminating the need for the user to pause pumping to evaluate the pressure (which may, in turn, reduce inflation time). Any combination of these and other improvements and advantages may be provided in some cases.

Figure 1:
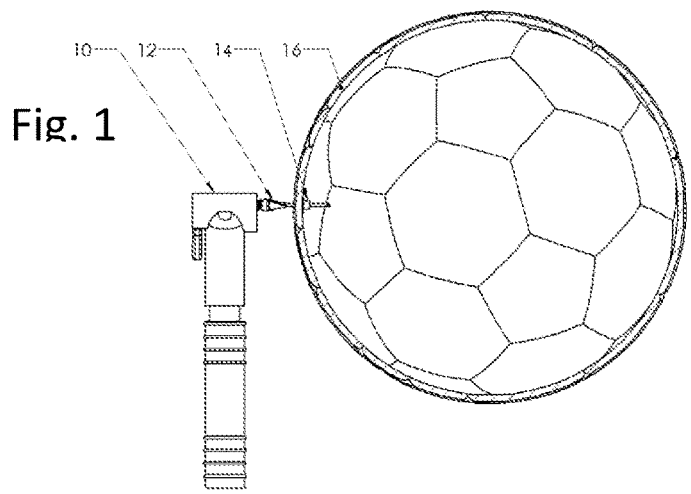
FIG. 1 is a perspective view of a typical inflation setup using a pressure regulator.

FIG. 1 shows an example sports ball inflation setup that includes an inflation source 10, a pressure regulator 12, an inflation needle receptacle 14, and an inflation object 16. In the example shown in FIG. 1, as the inflation source 10 operates, the inflating fluid is pushed through the inflating source 10, and into the inlet chamber of the pressure regulator 12. The air is then forced through the through the pressure regulator 12, and into the inflation object 16 via the inflation needle receptacle 14. In this example, the inflation fluid is air, but other inflation fluids (e.g., helium, argon, another inert gas, or any combination of these or other gasses) may be used in some cases. Also, the example pressure regulator 12 shown in FIG. 1 may be used with any type of inflatable device (e.g., sports balls or otherwise) that includes an inflation needle receptacle 14. The inflating source 10 can be a manually-operated hand pump (e.g., the conventional type used to inflate sports balls, tires, inner tubes, etc.), which produces an intermittent flow of inflation fluid.

Figure 2:
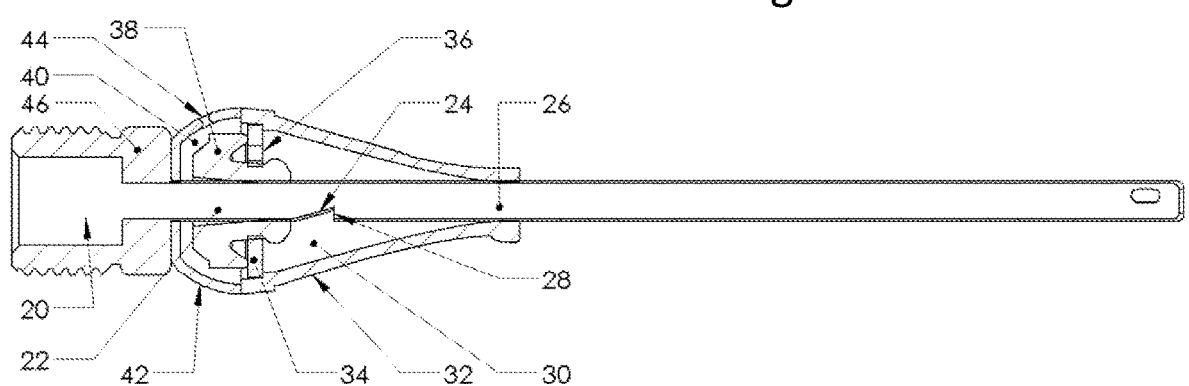
FIG. 2 is a section view of an example pressure regulator.

FIG. 2 shows an example pressure regulator, which may be used, for example, as the pressure regulator 12 shown in FIG. 1 or otherwise. The example pressure regulator 200 shown in FIG. 2 may be coupled to an inflation source (e.g., the example inflation source 10 shown in FIG. 1 or another type of inflation source). The example pressure regulator shown in FIG. 2 includes an inlet chamber 20, a conduit chamber 22, a relief indent 24, an outlet chamber 26, a relief chamber 30, a relief valve 38, a pressure regulating disk 34, a vent chamber 40, and a vent port 44. A pressure regulator may include additional or different components and features, which may be configured as shown or otherwise. The fluid chambers of the example pressure regulator 200 (the inlet chamber 20, conduit chamber 22, outlet chamber 26, relief chamber 30, and vent chamber 40) are enclosed by the conduit housing 46, the vent chamber housing 42, and the relief chamber housing 32. A target pressure setting may determined by the thickness of the pressure regulating disk 34 in which the relief valve 38 is mounted.

As shown in FIG. 2, during the inflation process, pressure builds in the inlet chamber 20 of the pressure regulator 12. As this happens, fluid is forced through the conduit chamber 22, around the relief indent 24, through the outlet chamber 26 and into the inflation object 16, thereby increasing the pressure inside the inflation object 16. Due to the increased flow velocity around the relief indent 24, a low pressure region is formed at the relief chamber inlet 28. This low pressure region may, in certain instances, ensure the fluid flow from the conduit chamber 22 (which is intended to inflate the inflation object 16) does not flow into the relief chamber 30. As pressure inside the inflation object 16 builds, a pressure differential grows between the outlet chamber 26 and the relief chamber inlet 28. As a result of this growing pressure differential, a relatively small amount of fluid may flow into the relief chamber 30 thereby slightly raising the pressure and momentarily balancing out the growing pressure differential. This process may allow the pressure inside the relief chamber 30 to mimic the pressure inside the inflation object 16, despite the pressure in the conduit chamber 22 and outlet chamber 26 being higher than either.

In the example shown in FIG. 2, the pressure regulating disk 34 resides adjacent to the relief chamber 30. The relief valve 38 is mounted in the pressure regulating disk 34, and seals around the outer diameter of the conduit chamber 22. Fluid passage openings 36 in the pressure regulating disk 34 allow for air to pass through the pressure regulating disk 34 and apply pressure to the underside of the relief valve 38. As the inflation process continues, the pressure on the underside of the relief valve 38 will eventually cause the relief valve 38 to open (at the opening pressure), allowing the built up pressure in the relief chamber 30 to flow into the vent chamber 40. The escaping fluid that moves into the vent chamber 40 will continue until the pressure on the underside of the relief valve 38 drops below the opening pressure, at which point the relief valve 38 will close by sealing against the pressure regulating disk 34. The fluid that passes around the relief valve 38 and into the vent chamber 40 will then exit through the vent port 44. In some implementations, fluid passing through the vent port 44 will create an audible whistling effect. Thus, once the user hears a whistle, they should stop pumping and allow the relief pressure to vent out the excess pressure. When the venting stops, the inflation object 16 is at the preset pressure. In the example shown in FIG. 2, the preset pressure is controlled by the thickness of the pressure regulating disk 34. The thickness of the pressure regulating disk 34 could be modified to correspond with the ideal pressures of commonly inflated objects. For example, the thickness could be modified to correspond to the ideal pressure for a basketball; thereby the user could quickly and easily inflate a basketball to the ideal pressure without referencing a pressure gauge or having knowledge of the ideal basketball inflation pressure.

Figure 3:
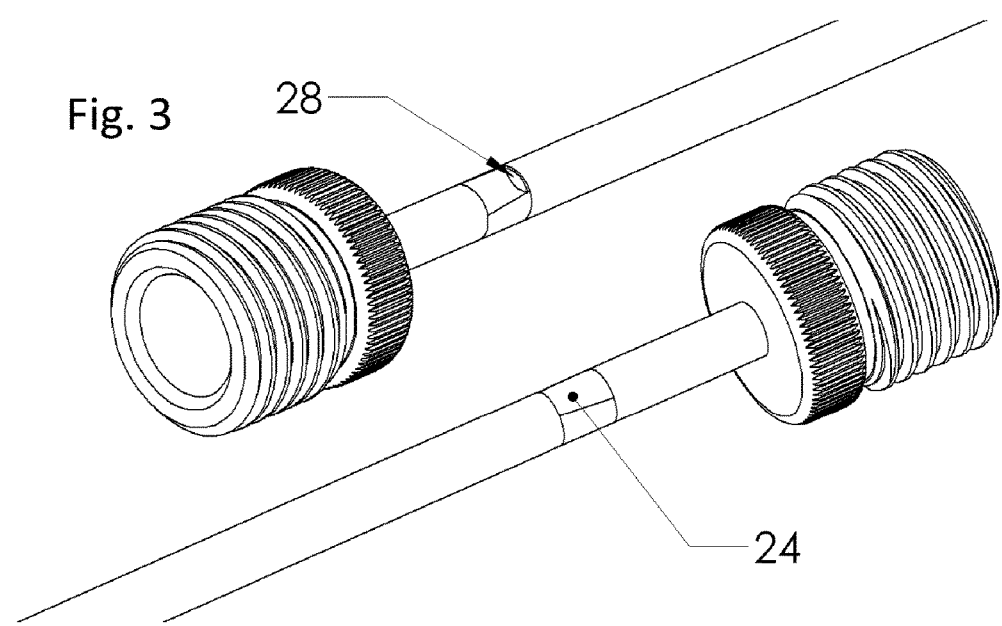
FIG. 3 is a perspective view of the relief indent shown in FIG. 2.

FIG. 3 shows the example relief indent 24 in more detail. The geometry of the relief indent is specific in that the orifice (the relief chamber inlet 28) created by the relief indent 24 is normal to the direction of flow of the inflating fluid, such that the inflating fluid may not flow through the relief chamber inlet 28 while fluid is being pushed into the inflation object 16, but may flow through the relief chamber inlet 28 during the venting process.

Figure 4:
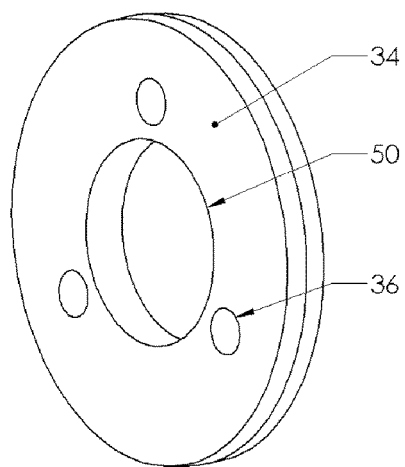
FIG. 4 is a perspective view of the example pressure regulating disk shown in FIG. 2.

FIG. 4 shows the geometry of the example pressure regulating disk 34 in greater detail. In FIG. 2, the relief valve 38 is mounted in the pressure regulating disk 34 by pressing it into the relief valve orifice 50. Fluid is allowed to pass through the pressure regulating disk via the fluid passage openings 36 (three shown, but one or more may be used).

There are various other ways to implement a pressure regulator that includes one or more of the advantages and technical improvements of the example pressure regulator 200 shown in FIG. 2; and the example pressure regulator 200 shown in FIG. 2 may be modified in a number of ways. For example, one or more of the pressure relieving features (including but not limited to the conduit chamber 22, relief indent 24, relief valve 38, pressure regulating disk 34, relief valve orifice 50, and fluid passage openings 36) may be incorporated in the relief chamber wall. For instance, some or all of these elements could be combined into a single part that would incorporate the function of all these features (as shown, for example, in FIG. 5 or otherwise). As another example, the whistling geometry of the vent port 44 may be incorporated into the fluid passage openings 36. As another example, the relief valve 38 (shown as a silicone umbrella valve in FIG. 2) may be replaced with alternative pressure regulating mechanisms (e.g., a spring and piston mechanism, or a Bellville umbrella valve, etc.), and the target pressure of the device may be preset by accounting for the features of such pressure regulating mechanisms. As another example, a pressure movable membrane (similar to a diaphragm valve) may be used instead of a flow diverting tube to physically seal off the relief chamber from the conduit during pressurization. In such cases, when pressurization stops, the pressure movable membrane may collapse, breaking the seal between the relief chamber and conduit allowing the pressures between the two chambers to equalize. As another example, the outlet may be modified to be compatible with other inflation objects besides needle inflated sports balls, such as, for example, a Schrader valve or Presta valve tires. As another example, the pressure regulating disk 34 can be implemented as an interchangeable component, thus providing the ability to quickly modify a needle setup to be used with different types of sports balls or other applications. As another example, features shown in FIG. 2 may be integrated into a tire inflator chuck or nozzle. As another example, a by-pass mechanism (e.g., a cover for the vent chamber outlet or fluid passage openings) may be used to allow the user to effectively keep the excess pressure from venting, thus using the pressure regulator 12 purely as a conduit flow path.

In some aspects of what is described, an inflatable object (e.g., a sports ball, a bicycle tire, etc.) may be inflated using an inflation device as described by the following examples:

Example 1

An inflation device (e.g., the example device shown in FIG. 2 or FIG. 5) comprising:
  an inlet (e.g., the inlet chamber 20), an outlet (e.g., at the opposite end of the outlet chamber 26), and a vent port (e.g., the vent port 44);
  one or more interior surfaces that define:
    a gas-delivery pathway fluidly-coupling the inlet and the outlet,
    a flow restriction (e.g., at relief indent 24) along the gas-delivery pathway between the inlet and the outlet,
    an opening (e.g., relief chamber inlet 28) along the gas-delivery pathway adjacent the flow restriction and downstream thereof,
    a gas-exhaust pathway fluidly-coupling the opening and the vent port,
    a first chamber (e.g., relief chamber 30) of the gas-exhaust pathway in fluid communication with the opening,
    a second chamber (e.g., vent chamber 40) of the gas-exhaust pathway in fluid communication with the vent port, and
    a pressure-relief valve (e.g., relief valve 38) configured to control gas flow between the first chamber and the second chamber.

Example 2

The inflation device of example 1, wherein the vent port is configured to produce an audible noise when gas traverses the vent port to enter an ambient environment of the inflation device.

Example 3

The inflation device of example 1 or example 2,
wherein the pressure-relief valve comprises a displaceable plug in contact with a pressure-regulating disk (e.g., pressure regulating disk 34); and
wherein the pressure-regulating disk comprises openings (e.g., fluid passage openings 36) that fluidly-couple the displaceable plug to the first chamber of the gas-exhaust pathway.

Example 4

The inflation device of example 1 or example 2 or example 3,
wherein interior surfaces defining the gas-delivery pathway comprise interior surfaces of a conduit (e.g., a cylindrical inflation needle configured to interface with an inflatable object);
wherein interior surfaces defining the gas-exhaust pathway comprise interior surfaces of a housing having a central thru-hole; and
wherein the conduit is disposed through the central thru-hole (e.g., as shown in FIG. 2).

Example 5

Figure 5:
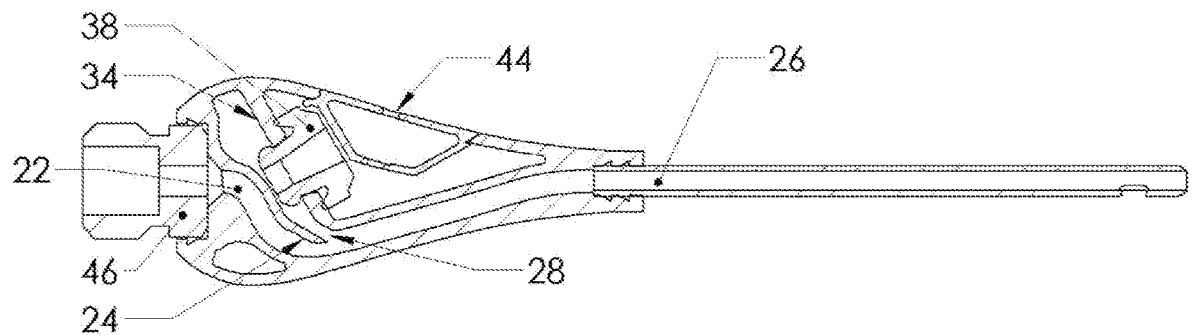
FIG. 5 is a section view of another example pressure regulator.

The inflation device of example 1 or example 2, wherein interior surfaces defining the gas-delivery pathway comprise:
interior surfaces of a conduit (e.g., a cylindrical inflation needle configured to interface with an inflatable object) and first interior surfaces of a housing;
wherein the conduit comprises an end fluidly-coupled to the housing (e.g., as shown in FIG. 5).

Example 6

The inflation device of example 5, wherein the first interior surfaces of the housing define a gap (e.g., the first interior surfaces may include a first interior wall and a second interior wall separated by the gap) serving as the opening from the gas-delivery pathway (e.g., as shown in FIG. 5).

Example 7

The inflation device of example 5 or example 6, wherein interior surfaces defining the gas-exhaust pathway comprise:
second interior surfaces of the housing defining an interior wall of the housing and an interior cavity of the housing;
wherein the interior wall partitions the interior cavity into the first chamber and the second chamber; and
wherein the interior wall has a displaceable plug disposed therethrough serving as part of the pressure-relief valve.

Example 8

The inflation device of example 7, wherein the housing comprises an exterior wall that defines the vent port.

Example 9

A method of inflating an inflatable object, the method comprising:
conveying gas from an inlet of an inflation device to an outlet of the inflation device, the inlet fluidly-coupled to the outlet by interior surfaces of the inflation device that define a gas-delivery pathway;
while conveying the gas, creating a region of low pressure at an opening along the gas-delivery pathway, the opening adjacent to and downstream of a flow restriction in the gas-delivery pathway;
receiving at least a portion of the conveyed gas into a first chamber of a gas-exhaust pathway, the first chamber of the gas-exhaust pathway in fluid communication with the opening, the gas-exhaust pathway defined by interior surfaces of the inflation device;
opening a pressure-relief valve inside the inflation device when gas pressure in the first chamber exceeds a relief pressure, the pressure-relief valve allowing gas to flow from the first chamber to a second chamber of the gas-exhaust pathway when open; and
exhausting gas through a vent port of the inflation device in response to gas flowing into the second chamber, the vent port in fluid communication with the second chamber.

Example 10

The method of example 9, wherein exhausting gas through the vent port comprises generating an audible noise when gas traverses the vent port.

Example 11

The method of example 9 or example 10, comprising:
coupling the outlet of the gas-delivery pathway to the inflatable object.

Example 12

The method of example 9 or any one of examples 10-11, wherein receiving at least the portion of the conveyed gas comprises:
increasing, as the inflatable object progressively inflates, a differential of gas pressure between the region of low pressure and the outlet; and
receiving gas through the opening into the first chamber in response to the increasing differential of gas pressure.

Example 13

The method of example 9 or any one of examples 10-12, wherein creating the region of low pressure comprises increasing a velocity of the conveyed gas proximate the flow restriction.

Example 14

The method of example 9 or any one of examples 10-13, comprising:
closing the pressure-relief valve when gas pressure in the first chamber of the gas-exhaust pathway is below the relief pressure.

Example 15

The method of example 9 or any one of examples 10-14, comprising:
  coupling the inlet of the gas-delivery pathway to a manually-actuated pump.

Example 16

The method of example 9 or any one of examples 10-15, wherein the inflatable object is a sports ball and the relief pressure is a target internal pressure of the sports ball (e.g., a desired internal pressure, within a recommended internal pressure range for the sports ball).

Example 17

The method of example 9 or any one of examples 10-15, wherein the inflatable object is a tire (e.g., a bicycle tire) and the relief pressure is a target internal pressure of the tire (e.g., a desired internal pressure, within a recommended internal pressure range for the tire).

Example 18

A method of inflating a sports ball, comprising:
  transporting gas from a pump, through an inflation device (e.g., the device shown in FIG. 2 or FIG. 5), into the sports ball;
  by operation of the inflation device (e.g., by operation of relief valve 38), detecting a pressure of gas in the sports ball; and
  by operation of the inflation device (e.g., by operation of the vent port 44), generating an audible signal in response to the detected pressure of gas exceeding a threshold value.

Example 19

A method of inflating a bicycle tire, comprising:
  transporting gas from a pump, through an inflation device, into the bicycle tire;
  by operation of the inflation device, detecting a pressure of gas in the bicycle tire; and
  by operation of the inflation device, generating an audible signal in response to the detected pressure of gas exceeding a threshold value.

Example 20

The method of example 18 or example 19, wherein:
  generating an audible signal comprises generating an audible whistling effect by exhausting gas from the inflation device when the pressure of gas in the sports ball (i.e., example 18) or bicycle tire (i.e., example 19) is greater than the threshold value.

Example 21

The method of example 18 or any one of examples 19 or 20, wherein the pump is a manually-actuated pump and the pressure of gas is detected by a pressure-relief valve.

Example 22

The method of example 18, wherein the inflation device is the inflation device of any one of examples 1-8.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. An inflation device comprising:
  an inlet, an outlet, and a vent port;
  one or more interior surfaces that define:
    a gas-delivery pathway fluidly-coupling the inlet and the outlet,
    a flow restriction along the gas-delivery pathway between the inlet and the outlet,
    an opening from the gas-delivery pathway to a gas-exhaust pathway, the opening defined adjacent the flow restriction and downstream thereof,
    the gas-exhaust pathway defined entirely by at least a portion of the one or more interior surfaces and fluidly-coupling the opening and the vent port,
    a first chamber of the gas-exhaust pathway in fluid communication with the opening,
    a second chamber of the gas-exhaust pathway in fluid communication with the vent port, and
    a pressure-relief valve configured to control gas flow between the first chamber and the second chamber.

2. The inflation device of claim 1, wherein the vent port is configured to produce an audible noise when gas traverses the vent port to enter an ambient environment of the inflation device.

3. The inflation device of claim 1,
  wherein the pressure-relief valve comprises a displaceable plug in contact with a pressure-regulating disk; and
  wherein the pressure-regulating disk comprises openings that fluidly-couple the displaceable plug to the first chamber of the gas-exhaust pathway.

4. The inflation device of claim 1,
  wherein interior surfaces defining the gas-delivery pathway comprise interior surfaces of a conduit;
  wherein interior surfaces defining the gas-exhaust pathway comprise interior surfaces of a housing having a central thru-hole; and
  wherein the conduit is disposed through the central thru-hole.

5. The inflation device of claim 1, wherein interior surfaces defining the gas-delivery pathway comprise:
interior surfaces of a conduit and first interior surfaces of a housing;
wherein the conduit comprises an end fluidly-coupled to the housing.

6. The inflation device of claim 5, wherein the first interior surfaces of the housing define a gap serving as the opening from the gas-delivery pathway.

7. The inflation device of claim 5, wherein interior surfaces defining the gas-exhaust pathway comprise:
second interior surfaces of the housing defining an interior wall of the housing and an interior cavity of the housing;
wherein the interior wall partitions the interior cavity into the first chamber and the second chamber; and
wherein the interior wall has a displaceable plug disposed therethrough and serving as part of the pressure-relief valve.

8. The inflation device of claim 7, wherein the housing comprises an exterior wall that defines the vent port.

9. A method of inflating an inflatable object, the method comprising:
conveying gas from an inlet of an inflation device to an outlet of the inflation device, the inlet fluidly-coupled to the outlet by interior surfaces of the inflation device that define a gas-delivery pathway;
while conveying the gas, creating a region of low pressure at an opening from the gas-delivery pathway to a gas-exhaust pathway, the opening defined adjacent to and downstream of a flow restriction in the gas-delivery pathway;
receiving at least a portion of the conveyed gas into a first chamber of the gas-exhaust pathway, the first chamber of the gas-exhaust pathway in fluid communication with the opening, the gas-exhaust pathway defined entirely by interior surfaces of the inflation device;
opening a pressure-relief valve inside the inflation device when gas pressure in the first chamber exceeds a relief pressure, the pressure-relief valve allowing gas to flow from the first chamber to a second chamber of the gas-exhaust pathway when open; and
exhausting gas through a vent port of the inflation device in response to gas flowing into the second chamber, the vent port in fluid communication with the second chamber.

10. The method of claim 9, wherein exhausting gas through the vent port generates an audible noise as gas traverses the vent port.

11. The method of claim 9, comprising:
coupling the outlet of the gas-delivery pathway to the inflatable object.

12. The method of claim 11, wherein receiving at least the portion of the conveyed gas comprises:
increasing, as the inflatable object progressively inflates, a differential of gas pressure between the region of low pressure and the outlet; and
receiving gas through the opening into the first chamber in response to the increasing differential of gas pressure.

13. The method of claim 9, wherein creating the region of low pressure comprises increasing a velocity of the conveyed gas proximate the flow restriction.

14. The method of claim 9, comprising:
closing the pressure-relief valve when gas pressure in the first chamber of the gas-exhaust pathway is below the relief pressure.

15. The method of claim 9, comprising:
coupling the inlet of the gas-delivery pathway to a manually-actuated pump.

16. The method of claim 9, wherein the inflatable object is a sports ball and the relief pressure is a target internal pressure of the sports ball.

17. The method of claim 9, wherein the inflatable object is a bicycle tire and the relief pressure is a target internal pressure of the bicycle tire.

* * * * *